United States Patent [19]

Langdon

[11] 4,383,443
[45] May 17, 1983

[54] LIQUID-LEVEL MEASUREMENT

[75] Inventor: Roger M. Langdon, Colchester, England

[73] Assignee: The Marconi Company Limited, Chelmsford, England

[21] Appl. No.: 222,759

[22] Filed: Jan. 6, 1981

[30] Foreign Application Priority Data

Jan. 15, 1980 [GB] United Kingdom ............... 8001268

[51] Int. Cl.³ .............................................. G01F 23/28
[52] U.S. Cl. ................................................ 73/290 V
[58] Field of Search ................................... 73/290 V

[56] References Cited

U.S. PATENT DOCUMENTS

| | | | |
|---|---|---|---|
| 3,080,752 | 3/1963 | Rich | 73/290 V |
| 3,133,442 | 5/1964 | Werner | 73/290 V |
| 3,229,523 | 1/1966 | Boyd et al. | 73/290 V |
| 4,213,337 | 7/1980 | Langdon | 73/290 V |

*Primary Examiner*—Edward R. Kazenske
*Assistant Examiner*—Joseph W. Roskos
*Attorney, Agent, or Firm*—Spencer & Kaye

[57] ABSTRACT

A liquid-level measuring device including, in effect, two similar elongate members each adapted to be partially submerged in a liquid, the two elongate members being displaced lengthwise relative to one another by an odd number of quarter wavelengths of a predetermined wavelength of a chosen flexurally resonant mode of the elongate members. Each elongate member has flexure wave transmitting elements in contact therewith for launching flexure waves along the member and flexure wave receiving elements in contact with the member for receiving flexure waves launched by the transmitting elements. Also, associated with each elongate member is a phase detection arrangement connected both to the transmitting elements and to the receiving elements for detecting and comparing the phase of the flexure waves at the transmitting elements with the phase at the receiving elements so as to obtain a phase difference measurement, the magnitude of which provides an indication of the resonance frequency of the elongate member. An operating unit is connected to the respective outputs of the two phase detection arrangements so as to provide an indication of the extent to which the elongate members are immersed in the liquid.

10 Claims, 6 Drawing Figures

MEDIUM : WATER
TUBE LENGTH : 30 cm

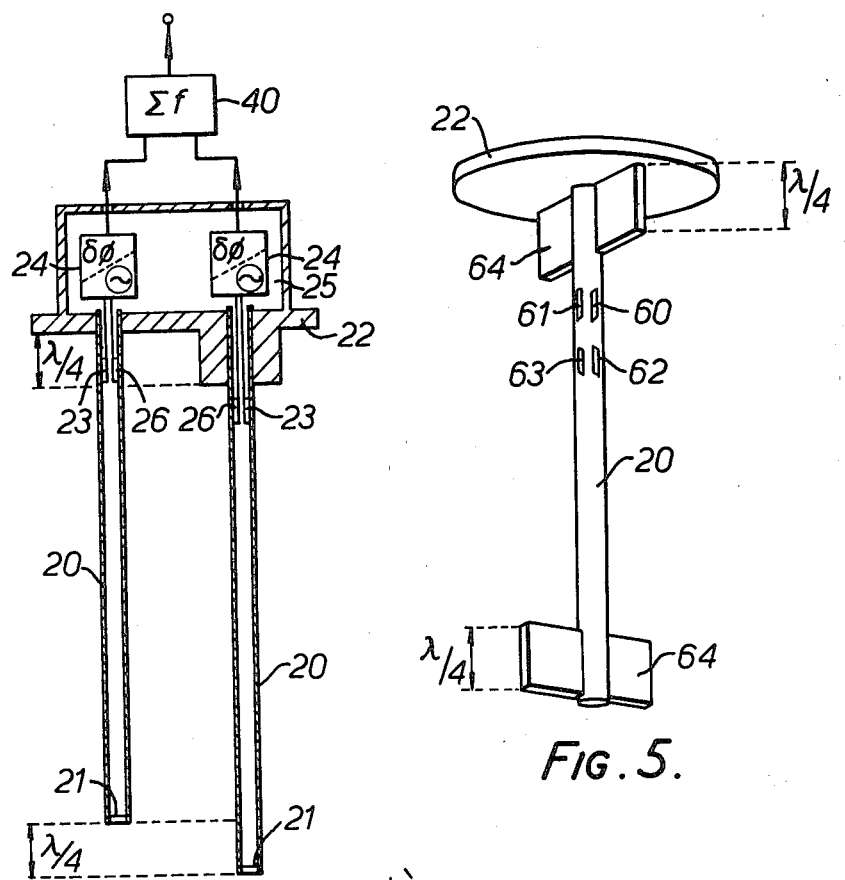
FIG.4.
FIG.5.
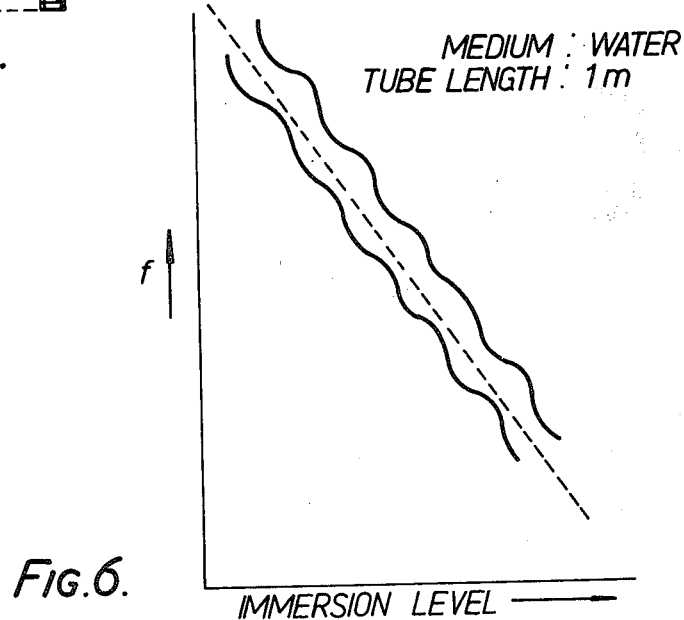
MEDIUM: WATER
TUBE LENGTH: 1m
FIG.6.

LIQUID-LEVEL MEASUREMENT

BACKGROUND OF THE INVENTION

1. Field of the Invention

This invention relates to liquid-level measurement, and concerns in particular devices for detecting and measuring the level of liquid in a container.

2. Description of the Prior Art

It is in general known that level measurements of a liquid in a container may be obtained by observing the behaviour of a vibrating rod partially immersed in the liquid. In particular, it is known that the natural flexural resonance frequencies of the rod are dependent upon the length of rod above and below the liquid surface, and that the detection of resonance at different frequencies can thus be used to indicate liquid level.

In my U.S. Pat. No. 4,213,337 I have described a liquid-level sensing device comprising an elongate member for immersion in a liquid, flexure wave transmitting means for launching flexure waves along the member, flexure wave receiving means for receiving flexure waves launched by the transmitting means, phase detection means for obtaining a phase difference measurement between the launched and received waves, and indicator means for showing thereby the extent of immersion of the elongate member. The device may be used to measure the degree of immersion either directly, as a function of the transit time (as given by the phase difference) of fixed frequency flexure waves passing along the elongate member, or indirectly, as a function of the resonance frequency of the elongate member when stimulated by scanned frequency flexure waves.

The device of my aforementioned Patent, though useful, does nevertheless suffer from one particular minor drawback, in that when used to measure liquid level in the indirect, resonance, mode it is not truly linear—thus, a graph of true liquid level against actual resonance frequency is not a straight line. Indeed, the graph, though averaging a straight line overall, exhibits a regular, periodic, perturbation arising from the relative insensitivity of the resonance frequency when a resonance node is approximately in conjunction with the liquid surface.

SUMMARY OF THE INVENTION

The present invention seeks to provide a modified form of the aforementioned inventive device which does not suffer from this drawback, by providing a liquid-level measuring device which comprises in effect two similar samples of the resonant-mode device of my aforementioned Patent so disposed that the elongate member of one is displaced by an odd number of quarter wavelengths ($\lambda/4$) with respect to the elongate member of the other ($\lambda$ being the wavelength of a chosen flexurally resonant mode of the elongate members), the outputs from the two phase detection means being in operation employed to provide the desired indication of the extent of immersion of the members.

Using the terminology of my aforementioned Patent, the present invention provides a liquid-level measuring device comprising, in combination:

(a) in effect, two similar elongate members each adapted to be partially submerged in a liquid, the two elongate members being displaced lengthwise one relative to the other by $\lambda/4$ (wherein $\lambda$ is as defined hereinbefore);

(b) for each elongate member,
flexure wave transmitting means in contact with the member, for launching flexure waves along the member, flexure wave receiving means in contact with the member, for receiving flexure waves launched by the transmitting means, and phase detection means, connected both to the transmitting means and to the receiving means, for detecting and comparing the phase of the flexure waves at the transmitting means with the phase at the receiving means so as to obtain a phase difference measurement the magnitude of which provides an indication of the resonance frequency of the elongate member; and (c) means for operating upon the outputs from the two phase detection means so as to provide an indication of the extent to which the elongate members are immersed in the liquid.

Although it is likely that the basic concept of flexural vibrations in a partially immersed elongate member is fully understood, it is convenient at this point briefly to summarise the situation, as follows:

Most materials commonly thought of as being rigid, such as steel in rod, tube, bar or plate form, are of course elastically flexible to a certain small degree—as witnessed by the characteristic "twang" of a throwing knife as it becomes embedded in the target, which noise arises mainly from the knife vibrating—flexing—at one or more of its resonant frequencies which occur in the audio range. Flexure waves can be induced in any elongate rigid member by applying an oscillatory thrust normal to the member's surface; if the thruster is driven in a sinusoidal manner at a particular frequency, the corresponding sinusoidal flexing motion of the member propagates away from the thruster with a characteristic velocity which is dependent on various parameters including the member's thickness, the driving frequency, and certain material constants. At particular frequencies the elongate member will resonate—that is to say, the amplitude of the flexing motion will vastly increase. Which frequencies cause resonance depends upon how the member is mounted (whether it is clamped at one end and free at the other, or whether it is clamped or free at both ends) and upon the wavelength of the flexural waves produced, but basically resonance is attained for an elongate member with only one end clamped if its length is approximately an odd number of quarter wavelengths.

The wavelength of a fixed frequency flexure wave travelling along an elongate member is influenced by the medium in which the member is situated, for the velocity of wave propagation is reduced as—for example—the density and viscosity of the medium increase, and (the flexure frequency remaining constant) it follows that the wavelength is reduced in exact correspondence. It also follws that because of this wavelength change a member which resonates in one medium will most likely not resonate at the same frequency in another, because the changed wavelength will not fit (as an odd number of quarter wavelengths, say) into the member's length. Thus: a member totally immersed in a "thin" medium like air allows flexural waves to propagate quickly, with a correspondingly long wavelength, and will resonate at a frequency such that the long wavelength fits (as an odd number of quarter wavelengths) into the member's length; a member totally immersed in a relatively "thick" medium like water allows flexural waves to propagate more slowly, with a correspondingly short wavelength, and will thus resonate at a different frequency—a frequency such that the short wavelength fits (as an odd number of quarter wavelengths) into the member's length.

As might be expected, for a member immersed partially in a thin medium (a gas like air) and partially in a thick medium (a liquid like water) the resonant frequency depends upon the degree of immersion. Consider a member projecting from air into water, with only a short portion actually in the water. In that short portion the flexural wave velocity is slower, and the wavelength is correspondingly shorter; if the member was resonating before partial immersion, then it will not be doing so after partial immersion because the total number of wavelengths (in both the immersed and non-immersed portions) is now slightly greater than that which previously fitted into the member's length. However, if a corresponding slight reduction is made in the frequency of the flexural waves (so that the wavelengths, particularly in the non-immersed portion, are slightly longer), then once again the number of wavelengths will fit the member's length, and resonance will be restored. From this it can be seen that as the extent of the member's immersion is increased so the frequency at which the member resonates is reduced. This effect can be employed to measure the depth of a "thick" medium in which the member is immersed; by scanning through a range of stimulating frequencies until there is found one that causes the partially-immersed member to resonate, so there is obtained a measure of the extent of immersion of the member.

As described in my aforementioned Patent, a very convenient way of noting resonant frequencies in an elongate member is by phase detection, in which there is compared the phase of the flexural vibrations as launched by the transmitting means with the phase as detected by the receiving means. As the elongate member passes through resonance in dependence upon the frequency of the flexure wave applied by the transmitting means, the phase difference between the transmitting and receiving means undergoes a fairly abrupt change from a first to a second value, and the driving frequency can be controlled to maintain the phase difference at a value intermediate the first and second phase values, so as to sustain the resonant mode (as described hereinafter, in a preferred embodiment this change is from a particular value in one sense to the same value in the opposite sense, passing through zero—at resonance—on the way, and the zero value is chosen as the maintained intermediate level). The resonance frequency provides an indication of the depth of immersion of the elongate member in the medium; when the medium's level changes, thus altering the extent to which the elongate member is immersed, so the driving frequency required to maintain resonance alters. The new resonance frequency indicates the new immersion depth, while the extent of the change in frequency is representative of the extent of the change in medium level.

The reason for the rapid change in detected phase difference value may be explained as follows.

When regular flexural waves are transmitted down an elongate member a certain amount of wave reflection takes place at the member's ends—that is, the wave travelling down the member to one end is reflected off that end back up the member, while a wave travelling up the member is, likewise, reflected back down the member. If the transmitted wave is continuous, then after a short length of time the various multiple reflections and re-reflections result in a whole series of waves travelling up the member, and a similar series travelling down the member. If all the waves are effectively in step (that is, if they are in phase)—a condition which is met automatically (for a member with one end clamped and the other free) if the wavelength is such that an odd number of quarter wavelengths approximately fits the member's length—then the member resonates; if they are out of step—out of phase—then resonance does not occur. Now, an analysis of the out-of-phase case shows that the multiple waves in each series of waves are spread—regularly displaced one from the next—along the member's length, the separation being determined by the difference between the actual wavelength and that wavelength that would result in resonance, and that if this separation is small then the waves can all be averaged together as though they were a single wave roughly in the middle of their spread (the elongate member behaving—flexing—as though that in fact was the case). Moreover, the analysis shows that the displacement (from the resonance position) of that average wave is proportional to a large multiple of the difference between the two wavelengths; thus, the displacement itself can be large even though the wavelength difference is small, and a small change in wavelength results in a large change in displacement. Finally, the analysis shows that, whereas where the wavelength difference is small—all the waves are almost in step—a small wavelength difference change in one direction results in a large displacement change, where the wavelength difference is itself large (so that the degree of the out-of-step condition is high and the waves overlap each other seemingly randomly), a small change in wavelength difference in that direction results only in a small change in displacement of the average wave. Accordingly, as the member passes through resonance the wavelength displacement change, measured by phase detection means, is relatively large and abrupt. This abrupt change can itself be used to control the driving frequency to maintain resonance, but—as described in more detail hereinafter—preferably it is the difference between the present value and the chosen intermediate value which is used.

As stated above, the resonant device of my aforementioned Patent suffers from non-linearity arising from the relative insensitivity of the resonance frequency to changes in liquid level when the position of a flexural node (point of minimum wave amplitude) corresponds with the position of the liquid surface. The present invention deals with this problem by, effectively, providing two like members so displaced (along their length direction—the direction of propagation of the flexural waves) that a node position in one corresponds more or less to an antinode position (the point of maximum wave amplitude) in the other. Accordingly, the depth of immersion at which the resonance frequency of one elongate member has a minimum sensitivity to liquid level change is identical to the depth of immersion at which the other elongate member has a maximum sensitivity to liquid level change, and by in effect averaging the outputs of the two systems there is obtained an approximately linear relationship between resonance frequency and liquid level.

The required displacement of one member with respect to the other is the distance from one node to the adjacent (or any) antinode—that is, a quarter wavelength (or any odd number of quarter wavelengths). Preferably it is the distance from one node to the adjacent antinode, and thus a quarter wavelenth ($\lambda/4$). Now, while $\lambda$ itself varies both with the extent of immersion and with the frequency, it is true to say that, over the small range of freqencies to be utilized for each device the actual change in $\lambda$ is small relative to $\lambda$ itself. Thus, for any given device the chosen value of $\lambda$—determining $\lambda/4$, and thus the displacement of one member relative to the other—is not critical, provided always that it does fall within the range of wavelengths actually involved. Purely for convenience, therefore, the $\lambda$ value chosen is usually the mean value of the wavelength in the immersed portion of each member averaged over the full range of depths of immersion of the member in the liquid. In practice the error involved in this approximation is small in comparison with the ideal displacement, and does not significantly affect linearity.

The actual frequency range employed with a device of the invention depends to a major extent upon the length of the elongate member. Considering, by way of example, a member clamped at one end only, it can be appreciated that the basic resonance mode is that wherein the member's length is a quarter wavelength, and that the higher modes (the first, second, third . . . harmonics) are those wherein the member's length is, respectively, threequarters, fivequarters, sevenquarters . . . of the wavelength. Thus the resonant wavelengths/frequencies are member-length dependant. In addition, there are a number of problems associated with using very low or very high resonant frequencies (that is to say, with using frequencies that produce wavelengths which are either comparable to or very much smaller than the member's length). In the former case (low frequency, long wavelength), the problem is that the frequency of operation is similar to vibration frequencies of machinery, such as pumps or motors, which may be attached to the tank in which the level measurement device is used. Under these circumstances the machinery vibration could induce into the elongate members waves comparable to the flexural waves being used, so detracting from the device's ability to measure liquid level correctly. In the latter case (high frequency, short wavelength), the flexural resonance frequencies of the elongate members are closed spaced, and may be less than the alteration in resonance frequency caused by immersing the elongate member in a liquid. As a result there may be two or more discrete levels of immersion corresponding to a particular resonance frequency, leading to ambiguity in the determining of liquid level. Both of these problems can be overcome, but they are preferably avoided by choosing a frequency of operation, intermediate the extremes, where neither problem exists.

By way of example, a relatively short member suitable for use in a device to measure battery electrolyte level might be from 5 to 20 cm, preferably 10 cm, long, and might be operated at a frequency of from 10 kHz to 1 kHz, preferably 3 kHz (giving a 3rd order mode wavelength in air of from 3 to 15 cm, preferably 7 cm), the expected change in frequency upon full immersion being about 500 Hz. On the other hand, a relatively long member suitable for use in a device to measure petrol level in a storage tank might be from 1 to 10 m, preferably 2.5 m long, and might be operated at a frequency of from 500 Hz to 3 kHz, preferably 2 kHz (giving a 10th mode wavelength in air of from 20 cm to 2 m, preferably 50 cm), the expected change in frequency upon full immersion being about 300 Hz.

The elongate members employed in the device of the invention may be clamped at one end and free at the other, they may be clamped at both ends, or they may be mounted—in a non-clamping member—at one or both ends. This latter fixing method has the advantage of partially isolating the members from vibrations induced in the tank by machinery; it can be effected by securing the member in a flexible mounting of soft rubber, or by securing it by metal springs which are sufficiently light and flexible not significantly to alter the frequency or wavelength of flexural vibrations of the member. In one particularly preferred embodiment each member is mounted at one end only, the mounting being in a "bush" of soft rubber.

The device of the invention employs, in effect, two elongate members longitudinally displaced one relative to the other by an odd number of quarter wavelengths. There may in fact be two separate members (conveniently disposed out of contact but side by side one with the other), but is most convenient to use a single member which is subjected to two different sets of flexural vibrations so that it acts as if it were two separate members each being subjected to a single set of vibrations.

When using a single member both the device's two transmitting/receiving means sets naturally have to be associated with the same—the only—elongate member. It is therefore important that the flexural waves "belonging" to one such set do not cause any significant interference with the operation of the other such set. This can conveniently be arranged by polarising each set's waves in a mode relatively undetectable by the other set, and an advantageous way of achieving this is to have the two waves plane-polarised at right angles to each other.

The avoidance of cross-coupling between the two sets of waves can be improved if the driving frequencies causing each set are slightly different—say, from 1–5% different. Thus, for two waves driven at about 3 kHz a satisfactory small frequency difference is 100 Hz (about 3%). This difference avoids frequency pulling between the two oscillators, and thus improves the distinctness of the results.

Also when using a single member there has to be some method of arranging that the member will behave as though it were two separate members longitudinally displaced one relative to the other by an odd number of quarter wavelengths, and this can be achieved when using two differently polarised flexural wave sets if the member's position can be made to appear different for each polarisation mode. A satisfactory way of attaining this end when employing two wave sets plane-polarised at right angles to each other is to mount quarter-wavelength-long vanes at each end of the elongate member, preferably in pairs, such that the vane (or vane pair) at one end is at right angles to the vane (or vane pair) at the other end. The vanes act as wave-attenuating mountings (the greater their lateral spread the more effective they are), so that in one polarisation mode the elongate member appears to extend from its actual top to the top of the bottom vane(s) while in the other mode it appears to extend from the bottom of the top vane(s) to its actual bottom. A device of this nature is described hereinafter with reference to the accompanying drawings. A similar effect could be obtained by mounting the elongate member on orthogonally-disposed elastic supports (springs, perhaps)—one near the top, the other near the bottom—fixed relative to the liquid's container, so as to allow the "top" of the rod to vibrate only in one plane while the "bottom" vibrates only in a second plane perpendicular to the first, but the vane solution is preferred.

The elongate member(s), the type, position and spacing of the transmitting and receiving means, the phase detectors and the indicating means can all be much the same as the corresponding items used in the invention the subject of my aforementioned Patent.

The elongate member may be a rod, a tube (preferably with its ends sealed off), a bar or a plate of some relatively rigid but nevertheless flexible material such as steel or glass. Preferably it is a tube of stainless steel. It may also advantageously be coated with an inert material, such as polytetrafluoroethylene (PTFE). rendering it impervious to the corrosive nature of any hostile environment in which it may be used.

The primary element of each set of wave transmitting and receiving means is most conveniently a piezoelectric transducer device arranged (as a transmitter) to contract/expand when electrically stimulated or (as a receiver) to produce an electrical output when caused to contract or expand (such devices are conventional per se).

The transmitting means primary element is associated with the usual anciliary equipment for supplying a suitable electrical input thereto, while the receiving means primary element is associated with the usual anciliary equipment for accepting the electrical output thereof. Thus, a transmitting transducer is associated with appropriate electronic circuitry supplying in operation a suitable driving wave (most preferably of sinusoidal form) of the appropriate frequency (the "appropriate" frequency is one that causes the elongate member to resonate, and so the electronic circuitry is required to be able to produce a range of frequencies appropriate to the length of the member and the mode in which it is to resonate, and at the same time to be directed onto that frequency that results in resonance). Similarly, the receiving transducer is associated with appropriate circuitry for amplifying the generated signal. The transmitting/receiving elements in each set may be arranged so that one element is at one end of the elongate member while the other element is at the other end, but generally it is convenient to have both elements near one end (normally the top end). Moreover, while the two primary elements of the transmitting means and receiving means of each set can be spaced along the length of the elongate member, it is in fact possible—and most convenient—to have the two elements positioned at the same length position down the member but at a laterally displaced position (for example, one on one side, the other on the other side, of the member). Finally, where the elongate member is tubular the transmitting/receiving means primary elements can advantageously be inside the tube rather than outside.

The phase detection means employed in the device of the invention provides in operation outputs which can be utilized to indicate the extent of immersion of the elongate members. More specifically, each phase detection means measures the phase difference (between the transmitted wave and the received wave), and uses the value of that difference to provide an indication of the resonance frequency of the elongate member. The way in which this is effected is conveniently by changing the transmitted wave frequency in dependence upon the difference between the present phase detection means output value and a chosen value of that output (selected, as described above, within the values passed through near to resonance) in such a way as to reduce that difference to nothing, so that when there is no difference the transmitted wave frequency is, or is very nearly, the resonance frequency itself. If the device has been suitably calibrated beforehand, then this resonance frequency can be converted directly to an immersion level indication. Conveniently, therefore, the phase detection means comprises a phase detector (of the conventional sort) connected via the wave transmitting and receiving means in a phase-locked-loop with the variable frequency oscillator used to drive the wave transmitting means, the relationship being such that the output of the phase detector (a signal whose magnitude varies as the difference in phase between the oscillator frequency and the wave frequency as perceived by the receiving means) is used to change the oscillator frequency in a sense so as to reduce that phase difference. In this preferred embodiment the chosen plane detection means output value intermediate the two output values between which the output level changes abruptly is zero—and when the phase detection means output value is zero then the oscillator is locked onto the frequency causing resonance in the elongate member.

The means for operating upon the two phase detection means' outputs is conveniently simply summing means employed to sum the two output frequencies. It is preferably a counting circuit which counts the two frequencies sequentially over predetermined time intervals, and sums the result over a comparatively long period, though alternatively it may be an Exclusive OR gate to the two inputs of which are applied the two detection means' outputs and from the output of which there may be extracted by conventional filtering a component at the sum frequency.

Most preferably the inventive device is associated with indicator means employed to give a visual indication of the depth measurement obtained. This indicator means may be any convenient device or circuit capable of providing the desired visual indication. Preferably, however, it is a suitably programmed microprocessor (which, say, counts the sum frequency produced by the summming means, and calculates a value for the liquid level in response to the received sum frequency, possibly taking into account predetermined calibration data) feeding a numerical display using light-emitting diodes or other conventional means.

The advantages of the inventive flexure wave level measurement device may be summarised as follows. The output (resonance) frequency is dependent mainly on the mechanical characteristics of the elongate member and the liquid in contact with it, and is dependent to only a small extent on the characteristics of the associated electronics. The measurement reliability should therefore be high, because faults are unlikely to develop in the mechanical structure, and any fault which develops in the electronics is likely to cause either a complete stoppage of the output signal or a change in frequency outside the normal operating range, so that the fault can be immediately identified by the processing electronics. The mechanical construction of the elongate member may be exceptionally simple and robust, so it can stand a certain amount of rough handling. The construction material can be chosen from a wide range of metals and certain ceramics to operate in corrosive liquids. A preferred device's sensitivity to pressure is extremely low, and it can operate under the extremes of pressure used in industrial processes without significant change in calibration. The maximum operating temperature of a preferred embodiment is approximately 200° C. at present due to limitations imposed by the preferred piezoelectric transducers, but this may be extended by using alternative materials. The minimum operating temperature has not been established, but reliable operation of one embodiment at liquid nitrogen temperature (77° K.) has been demonstrated.

BRIEF DESCRIPTION OF THE DRAWINGS

Certain embodiments of the invention will now be described in more detail, though only by way of illustration, with reference to the accompanying drawings in which:

FIG. 4 shows in sectional view a simplistic representation of the main components of a device of the invention using two separate elongate members;

FIG. 5 shows a perspective view from below of the vaned elongate member of an inventive device using two differently polarised sets of flexural waves; and FIG. 6 shows graphically the same sort of results as in FIG. 3 but as provided by an inventive device.

DETAILED DESCRIPTION OF THE PREFERRED EMBODIMENTS

Figure 1:
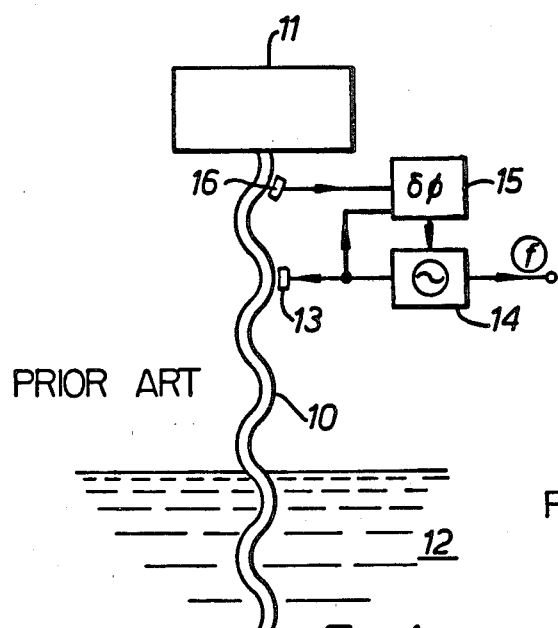
FIG. 1 is a diagrammatic representation of a prior art liquid level measurement device illustrating the principles involved.

The principle of liquid level measurement by means of flexural vibration may be explained with reference to FIG. 1, which shows the basic construction of a prior art level measuring device consisting of a rigid metal rod (10) of suitable cross-section mounted on a comparatively massive block (11) and inserted into the liquid (12) whose depth is to be measured. A piezoelectric transducer (13) is attached to the rod 10 to generate flexural vibrations at frequencies in the kilohertz range, and receives a driving sinusoidal voltage from an oscillator (14).

The speed with which the vibrations pass along the rod 10 is constant for a given frequency, and depends on such things as the density and elastic constants of the metal and the rod dimensions. It also depends on the nature of the medium surrounding the rod so that when it is immersed in a liquid 12 a significant reduction in wave velocity occurs as compared to when it is wholly in air. Consequently, when the rod is mounted (on block 11) in such a way that it can vibrate in resonance in a flexural mode, the transit time of waves passing along the rod 10, and hence the frequency of vibration, is reduced by immersion in the liquid 12. The change in resonance frequency is approximately linearly dependent on the fraction of the rod immersed, so that this frequency provides in effect, a measure of liquid level.

The tube is maintained in resonant vibration by the oscillator 14 as controlled by the detector module (15). The oscillator 14 is a variable frequency oscillator which supplies power to the transmitter piezoelectric transducer 13, while a second piezoelectric transducer (16), the receiver transducer, provides a phase reference signal indicating the difference between the oscillator frequency and the mechanical resonance frequency. The output of the detector module 15 is used to adjust the oscillator frequency until the latter is exactly identical to the mechanical vibration frequency. In this fashion the oscillator 14 tracks the changes in frequency which occur when the liquid level changes, and so provides a level-dependent output signal.

Figure 2:
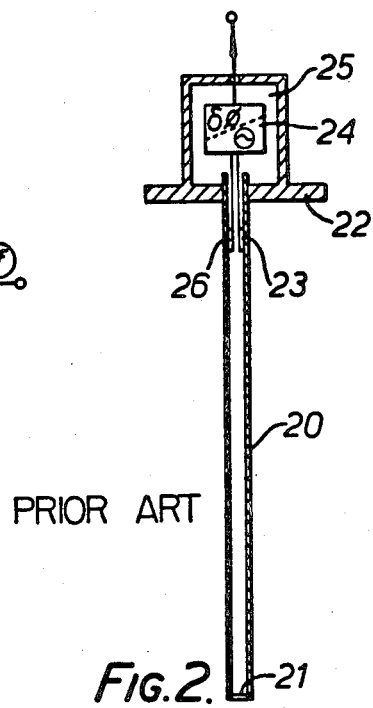
FIG. 2 shows in sectional form a simplistic representation of an actual prior art device.

A simple practical device is shown in FIG. 2. This device consists of a brass tube (20) closed at the lower end (21) and affixed to a suitable mounting flange (22) at the other end for attachment to the ceiling of a tank (not shown) containing the liquid whose depth is to be measured. The tube 20 is 30 cm long, and has inside and outside radii of about 2 and 3 mm respectively.

Flexural vibrations are generated by a ceramic piezoelectric transducer (23) attached to the inside wall of the tube 20 and driven by signals from an oscillator/detector module (24) retained within a chamber (25) supported above the mounting flange 22. The generated vibrations are subsequently received by a second like transducer (26) mounted on the tube 20 inner wall opposite the first transducer 23. Each transducer 23/26 consists of a piece of lead-zirconate-titanate (PZT) material approximately $2 \times 1 \times 16$ mm bonded to the tube wall by epoxy resin. When a driving voltage is applied to the transmitter transducer 23 it contracts lengthwise, causing a bending moment in the tube 20, so that when a sinusoidal voltage is applied a sinusoidal flexural vibration is produced. The tube can vibrate flexurally at certain discrete resonance frequencies which are determined by the condition that the tube length be approximately an odd number of quarter wavelengths.

Figure 3:
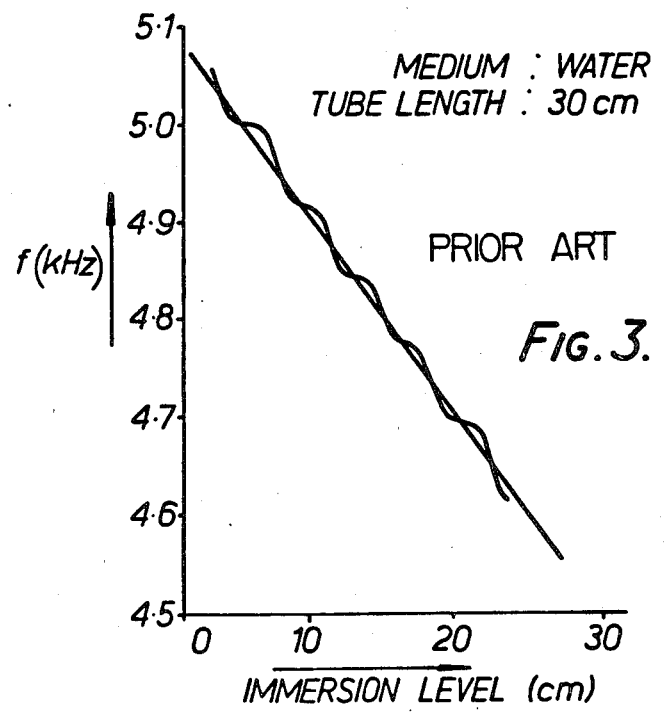
FIG. 3 shows graphically an output obtainable using a device of the type shown in FIG. 2.

The relationship between frequency and depth as measured by the FIG. 2 device is shown in FIG. 3, which depicts in graphical form the result of a calibration in water. It can be seen (from the heavy line) that the relationship is approximately linear over the full length of the tube, but that there is a small periodic non-linearity superimposed. This non-linearity occurs as a result of standing waves on the flexural vibration of the tube, which waves produce vibrational nodes at intervals along the tube's length. The sensitivity of frequency to level change is low in the vicinity of the nodes, causing a change in the slope of the calibration curve at those points.

The inventive devices provide a reliable method of removing the effect of this non-linearity. One such device, using two similar tubes 20 (as in FIG. 2) side by side, is shown in FIG. 4. One tube 20 is displaced vertically with respect to the other by a quarter of a flexural wavelength. This makes the nodes on one tube adjacent to the antinodes on the other, with the result that when the frequencies of the two are added together by the summing module (40) the periodic non-linearity in each cancels out, and there is obtained a very nearly linear relationship between the sum frequency and the liquid level.

A rather more elegant way of achieving the same result by using a single elongate member is shown in FIG. 5. In this case a single tube 20 (1 m long and 20 mm diameter) is used to support two independent 10th mode flexural vibrations (at about 3 kHz, separated by 100 Hz) polarised along two orthogonal axes, which vibrations are maintained by two independent sets of piezoelectric transducers (60,61 and 62,63) mounted at the top of the tube 20. By positioning a quarter wavelength long double vane (64) at each end of the tube as shown (one orthogonally disposed relative to the other), the nodal positions for the two vibrations can be displaced with respect to each other by the required quarter wavelength amount. The two separate vibration frequencies are then "added" together by an electronic circuit (as in FIG. 4) to yield a substantially linear relationship between the sum frequency (here depicted as an average) and the liquid level (as shown, diagrammatically, for water in the graph of FIG. 6).

I claim:

1. A liquid-level measuring device comprising, in combination:

in effect, two similar elongate members each adapted to be partially submerged in a liquid, the two elongate members being displaced lengthwise one relative to the other by an odd number of quarter wavelengths ($\lambda/4$), $\lambda$ being the wavelength of a chosen flexurally-resonant mode of the elongate members;

for each elongate member, flexure wave transmitting means in contact with the member, for launching flexure waves along the member, flexure wave receiving means in contact with the member, for receiving flexure waves launched by the transmitting means, and phase detection means, connected both to the transmitting means and to the receiving means, for detecting and comparing the phase of the flexure waves at the transmitting means with the phase at the receiving means so as to obtain a phase difference measurement the magnitude of which provides an indication of the resonance frequency of the elongate member; and means for operating upon the outputs from the two phase detection means so as to provide an indication of the extent to which the elongate members are immersed in the liquid.

2. A device as claimed in claim 1, wherein the displacement of one member with respect to the other is a quarter wavelength ($\lambda/4$), and the $\lambda$ value chosen is the mean value of the wavelength in the immersed portion of each member averaged over the full range of depths of immersion of the member in the liquid.

3. A device as claimed in claim 1, wherein each elongate member is mounted in a non-clamping manner at one end only.

4. A device as claimed in claim 1, wherein there is used a single member which is subjected to two different sets of flexural vibrations so that it acts as if it were two separate members each being subjected to a single set of vibrations, and wherein, so that the flexural waves "belonging" to one such set do not cause any significant interference with the operation of the other such set, each set's waves are polarised in a mode relatively undetectable by the other set.

5. A device as claimed in claim 4, wherein the driving frequencies causing each set of waves are from 1–5% different.

6. A device as claimed in claim 4, wherein, in order to ensure the single elongate member will behave as though it were two separate members longitudinally displaced one relative to the other by an odd number of quarter wavelengths, and when employing two wave sets plane-polarised at right angles to each other, quarter-wavelength-long vanes are mounted at each end of the elongate member such that the vane(s) at one end is at right angles to the vane(s) at the other end.

7. A device as claimed in claim 1, wherein the primary element of each set of wave transmitting and receiving means is a piezeoelectric transducer device arranged (as a transmitter) to contract/expand when electrically stimulated or (as a receiver) to produce an electrical output when caused to contract or expand, and wherein the two primary elements of the transmitting means and receiving means of each set are positioned at the same length position down the elongate member but at a laterally-displaced position.

8. A device as claimed in claim 1, wherein the phase detection means comprises a phase detector connected via the wave transmitting and receiving means in a phase-locked-loop with a variable frequency oscillator used to drive the wave transmitting means, the relationship being such that the output of the phase detector (a signal whose magnitude varies as the difference in phase between the oscillator frequency and the wave frequency as perceived by the receiving means) is used to change the oscillator frequency in a sense so as to reduce that phase difference, and wherein the means for operating upon the two phase detection means' outputs is summing means employed to sum the two output resonance frequencies.

9. A liquid-level measuring device comprising:

first and second elongate members constructed for partial submersion in a liquid the level of which is to be measured, said first and second elongate members being displaced with respect to one another by an odd number of quarter wavelengths ($\lambda/4$), $\lambda$ being the wavelength of a chosen flexurally resonant mode of said elongate members;

first and second flexure wave transmitting means each in contact with a respective one of said first and second elongate members for launching separate flexure waves along said first and second elongate members, respectively;

first and second receiving means each in contact with a respective one of said first and second elongate members for receiving a respective one of the separate flexure waves launched by said first and second transmitting means, respectively;

first and second phase means each connected to a respective one of said first and second transmitting means and a respective one of said first and second receiving means, said first phase means detecting the phase of the flexure wave transmitted by said first transmitting means and the phase of the flexure wave received by said first receiving means and comparing these two phases to obtain a first phase difference measurement the magnitude of which provides an indication of the resonance frequency of said first elongate member, said second phase means detecting the phase of the flexure wave transmitted by said second transmitting means and the phase of the flexure wave received by said second receiving means and comparing these two phases to obtain a second phase difference measurement the magnitude of which provides an indication of the resonance frequency of said second elongate means; and means for combining said first and second phase difference measurements to provide an indication of the liquid level.

10. A liquid-level measuring device comprising:

a single elongate member having opposite ends and constructed for partial submersion in a liquid the level of which is to be measured;

first and second flexure wave transmitting means each in contact with said elongate member for launching respective first and second flexure waves plane-polarized at right angles to each other along said elongate member;

first and second receiving means each in contact with said elongate member for receiving a respective one said first and second flexure waves;

first and second vanes each mounted at a respective one of the opposite ends of said elongate member, said first vane being mounted at a right angle to said second vane, and each vane having a length equal to one-quarter of a wavelength of a chosen flexurally resonant mode of said elongate member, wherein said single elongate member and said first vane together form a first medium for supporting said first flexure wave and said single elongate member and said second vane together form a second medium for supporting said second flexure wave, said first and second flexure waves having their respective nodal positions displaced relative to each other by one-quarter of said wavelength in said flexurally resonant mode;

first and second phase means each connected to a respective one of said first and second transmitting means and a respective one of said first and second receiving means, said first phase means detecting the phase of said first flexure wave transmitted by said first transmitting means and the phase of said first flexure wave received by said first receiving means and comparing these phases to obtain a first phase difference measurement the magnitude of which provides an indication of the resonance frequency of said first medium, said second phase means detecting the phase of said second flexure wave transmitted by said second transmitting means and the phase of said second flexure wave received by said second receiving means and comparing these phases to obtain a second phase difference measurement the magnitude of which provides an indication of the resonance frequency of said second medium; and means for combining said first and second phase difference measurements to provide an indication of the liquid level.

* * * * *